United States Patent [19]
Landstrom et al.

[11] Patent Number: 4,567,732
[45] Date of Patent: Feb. 4, 1986

[54] METHOD AND SYSTEM FOR CONTROLLING THE ENVIRONMENT IN A GREENHOUSE

[76] Inventors: D. Karl Landstrom, 903 Neil Ave., Columbus, Ohio 43215; William H. Wilkinson, 3089 Oakridge Rd., Columbus, Ohio 43221

[21] Appl. No.: 497,893

[22] Filed: May 25, 1983

[51] Int. Cl.⁴ .................................... F25D 17/06
[52] U.S. Cl. ........................................ 62/91; 62/311; 62/309; 47/17
[58] Field of Search ............................ 237/2 B; 47/17; 62/238.3, 238.6, 324.1, 467, 235.1, 304, 309, 311, 91

[56] References Cited

U.S. PATENT DOCUMENTS

| | | |
|---|---|---|
| 2,075,036 | 3/1937 | Hollis ................................. 62/310 |
| 3,116,612 | 1/1964 | Pennington ......................... 62/311 |
| 4,223,535 | 9/1980 | Kumm . | |

FOREIGN PATENT DOCUMENTS 60110 9/1982 European Pat. Off. ............ 237/2 B

*Primary Examiner*—Henry Bennett
*Attorney, Agent, or Firm*—Robert B. Watkins

[57] ABSTRACT

Systems and methods are provided to regulate the environment in a greenhouse where food and flower production is carried out, and in which outside air is inducted into the enclosure of the greenhouse through an evaporative cooler. A portion of the inducted air is recirculated, selectively heated or cooled and dehumidified, and mixed with the inducted air after contact with the agriculture in the greenhouse.

16 Claims, 2 Drawing Figures

METHOD AND SYSTEM FOR CONTROLLING THE ENVIRONMENT IN A GREENHOUSE

BACKGROUND OF THE INVENTION

This invention relates to systems and methods used in controlled-environment agriculture. More particularly, it relates to methods, and means to regulate the environment in a greenhouse where food and flower production is carried out, and the environmental conditions surrounding the greenhouse are less than optimal. It is directed to carrying out the regulation of the environment in the greenhouse with maximum efficiency, using the least external energy and providing economies in the process.

Improved technologies, genetic manipulation, and agriculture practices have dramatically increased worldwide food production, usually at a cost of increased energy use. A combination of factors such as poor climate, problem soils, increased energy costs, and other economic and political factors have caused many of the poorest countries to actually show decreased food production.

The highest food production increases of the past have been obtained in the most favorable environments—areas with good soils, controlled water supplies, the least risk from pest damage, and easy access to markets. While it is likely that much of the production increases in the next few decades will come from these same favored areas, an increasing proportion must come from regions less well endowed with favorable natural and biological environments or from controlled-environment agriculture.

Controlled-environment agriculture can modify or eliminate many of the natural barriers to food production, and the challenge of the future will be to broaden the base of increased food production to include areas which are not endowed with natural and economic resources.

Controlled-environment agriculture is the cultivation of vegetable, ornamental, and other plants in an enclosure within which those environmental factors which are generally recognized as influencing plant growth, maturation, and productivity, are systematically timed, programmed and carefully controlled. Typically the controlled growth factors included the intensity, duration, and spectral distribution of insulation, the temperature, humidity, and flow rate of the air, its carbon dioxide concentration and the composition and temperature of the nutrient supplied to the growing plants. This later parameter is easily controlled in those installations in which hydroponics techniques are employed, as the nutrient solutions used with hydrophonics may readily be analyzed for chemical composition and replenished as necessary to maintain their compositions within the desired ranges of variation of the constituents. This invention is directed to the more difficult environmental control problems and particularly those connected with air temperature, humidity, circulation, and insulation.

A greenhouse is inherently a structure that is greatly influenced by the amount and control of insulation. Various methods have been devised to accomplish this. Greenhouses usually provide large surface areas of translucent or transparent materials. During certain portions of the day the sun passes through these materials and has a strong effect on the environment within the greenhouse facility. Most greenhouses have means for regulating the amount of insulation and this is often done with shades, blinds, coatings, or black liquids.

U.S. Pat. No. 4,195,441—Baldwin, is typical of a more advanced solar greenhouse having means for shading and controlling insulation as well as being representative of many other facets of the typical "controlled environment agriculture facility".

U.S. Pat. No. 4,163,342—Fogg et al., discloses another controlled environment agricultural system in which insulation is not a factor and light is provided artificially as a means of very finitely controlling its amount and intensity.

Still another U.S. Pat. No. 3,807,088'—Jones, shows a controlled environment facility in which evaporative pads are extended across an end of the building providing a measure of air temperature and humidity control.

The above recited patents, together with U.S. Pat. No. 3,446,272—Gaines, are representative of the considerable extent of specific detail to which the prior art has developed this field of invention. There is good reason for this since what might appear to be minor details and variations in means and methods are often, to the contrary, very important in providing the most successful operations.

As stated at the beginning of this background discussion, the criteria of an efficient energy use has become of major significance with recent increases in energy cost. Therefore, means which increase this factor take on great significance in creative innovative activity.

SUMMARY OF THE INVENTION

In summary this invention is an air circulating and conditioning system for enclosures where agriculture is carried out separately from ambient outside air conditions, comprising means for inducting outside air into the enclosure through an evaporative cooler and for circulating inducted air through the enclosure into contact with the agriculture; means for circulating a portion of the contacted air through a heat exchanger to selectively heat or cool the portion; and means for mixing the portion with the inducted air to adjust the temperature and humidity of the inducted air before it is circulated into contact with the agriculture.

This invention includes a method of controlling the atmosphere within a controlled environment agriculture facility comprising: inducting outside air into the agriculture facility through an evaporative cooler, thereby cooling and humidifying the air; circulating the cooled and humidified air across the agriculture in the facility, further humidifying the air; recirculating a portion of the circulated air through a heat exchanger, cooling and dehumidifying the air; and mixing the cooled and dehumidified portion with the inducted air entering the facility, to control the atmosphere in the facility and provide an optimum atmosphere for the agriculture.

A feature of this invention is the use of an evaporative cooler as the primary first air conditioning means when outside air is inducted into the agricultural facility. In many climates the normal outside air is sufficiently dry that it can be cooled by the absorption of moisture. Moist air is beneficial to agricultural growth so that evaporative cooling as a beginning premise is an attractive and beneficial means and method.

Another feature of this invention is the means for the process step of recirculating a portion of the inducted air which has contacted the agriculture, and mixing this portion with the inducted air to adjust the temperature and humidity of the inducted air before it is circulated into contact with the agriculture.

Still another feature of the invention is the means for and the method of passing the exhaust air from the agricultural facility across a second heat exchanger thereby heating the exhaust portion while selectively cooling various other components of the system.

Further advantages in the system and methods will be seen in the manner by which the energy available and applied is conserved, and reused repetitively, at various stages, and time sequences and periods in the total operation of the facility, through the complete operating cycle during various outside ambient operating conditions. Conservation and reuse of energy importantly contributes to the overall efficiency of the controlled environment agricultural facility.

The foregoing and other advantages of the invention will become apparent from the following disclosure in which a preferred embodiment of the invention is described in detail and illustrated in the accompanying drawings. It is contemplated that variations in structural features and arrangement of parts may appear to the person skilled in the art, without departing from the scope or sacrificing any of the advantages of the invention.

DETAILED DESCRIPTION OF THE INVENTION

Figure 1:
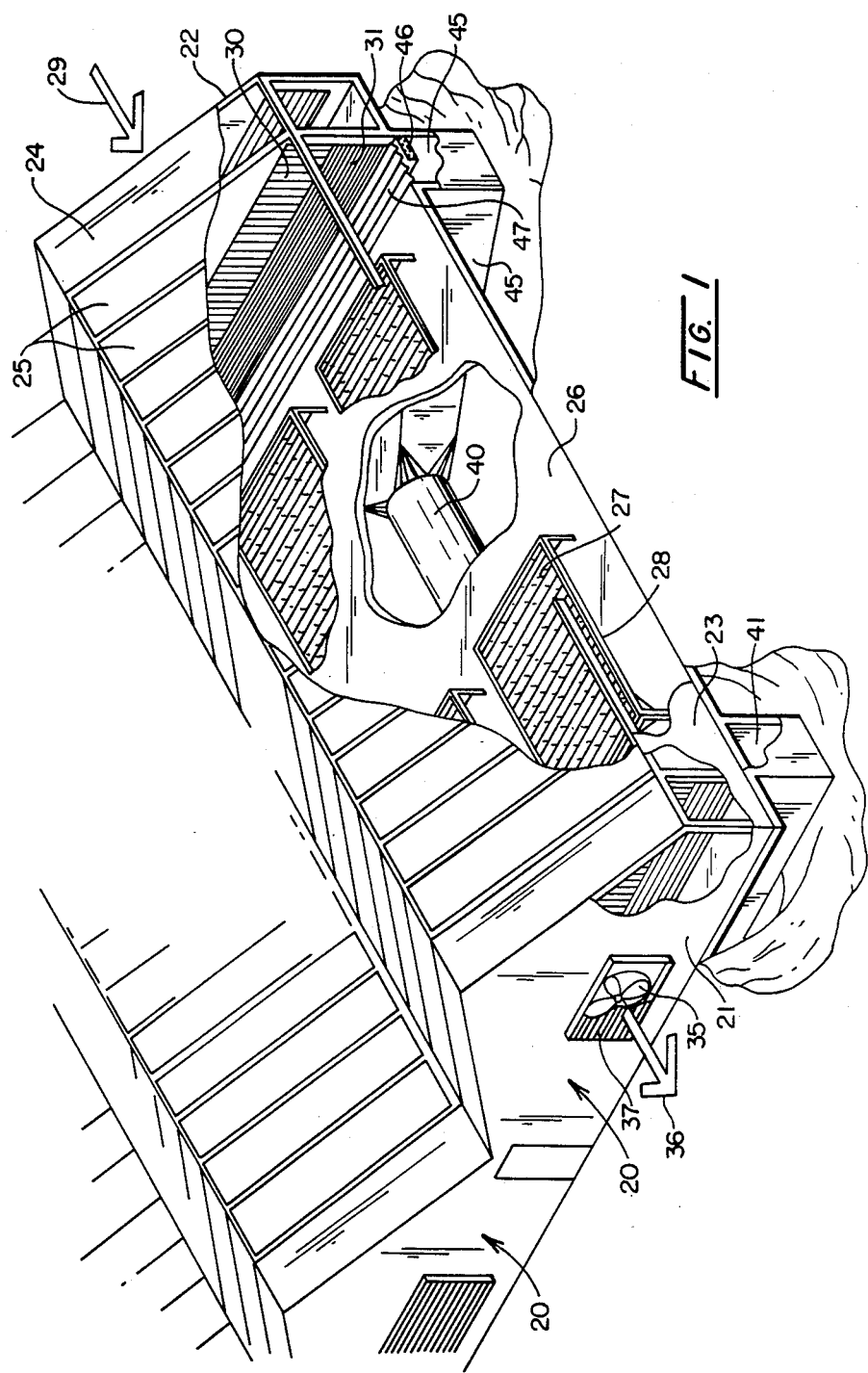
FIG. 1 is a partially cutaway perspective view of a controlled environment agricultural facility forming a part of the means and system of this invention, and which is useful in practicing the methods of this invention.

Referring to FIG. 1 a plurality of greenhouses 20 (each of which is a controlled environment agricultural facility) are disposed side by side for convenience. Each greenhouse 20 may be separate, and includes a structure comprising end walls 21, 22, side walls 23 and a roof 24. The roof 24 includes a plurality of translucent panels 25. The walls 21, 22, 23 and roof 24 define an enclosure 26 in which agricultural plants 27 are placed to grow.

Figure 2:
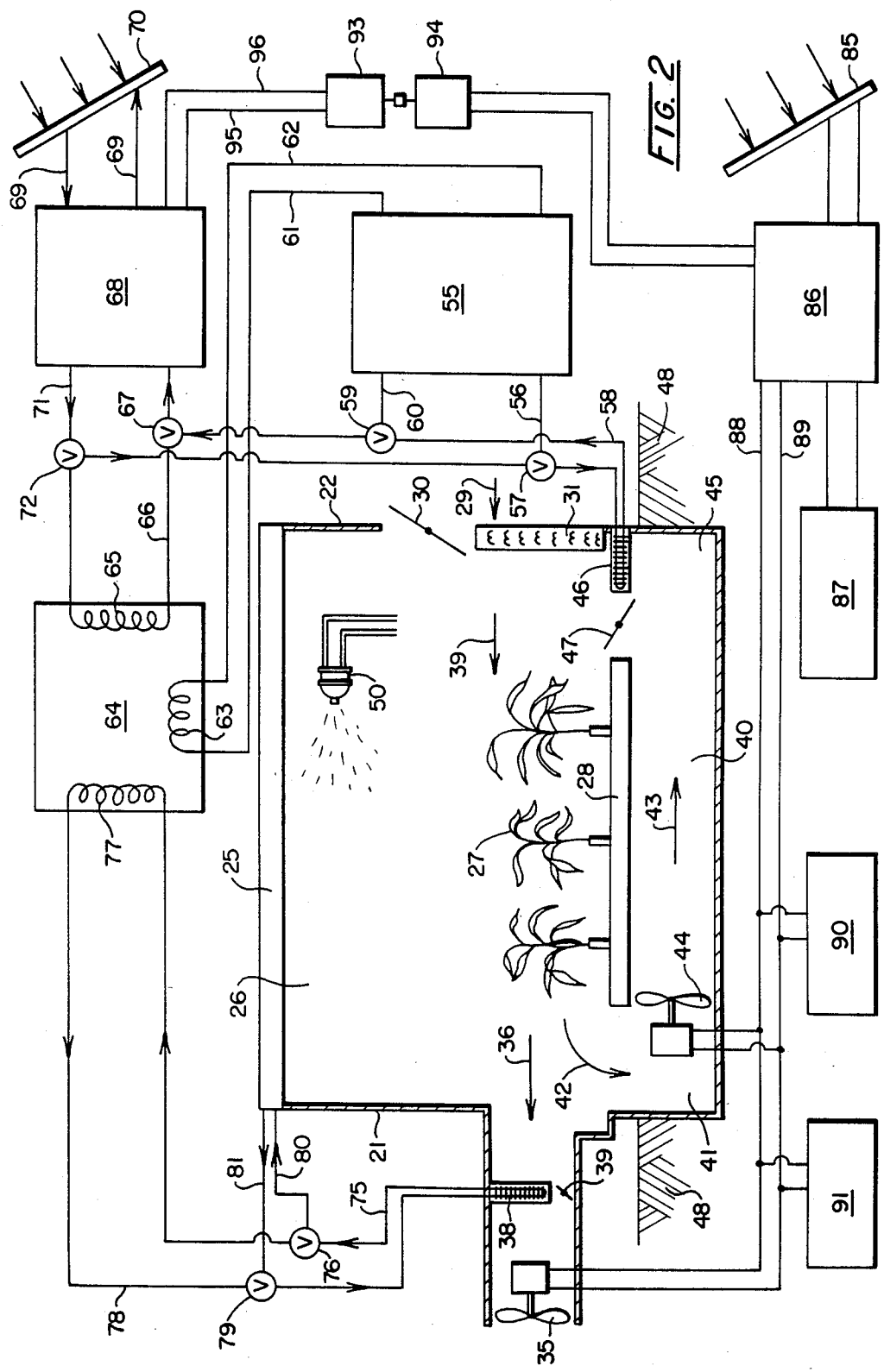
FIG. 2 is a schematic elevational view of the system of this invention showing the typical means whereby the methods of the invention may be practiced.

Referring to FIG. 2 also, the plants 27 may be on racks 28, in hydrophonic trays or trough systems, conventional soil or sandbag culture.

Outside air is inducted into the enclosure 26 at one end wall 22 as indicated by the arrow 29 through one or more associated adjustable bypass louver means 30 and an evaporative cooler 31. The air is induced to enter the enclosure 26 by a variable speed exhaust fan 35 at the opposite end 21 as indicated by the arrow 36 and one or more associated adjustable bypass louver means 37. A heat exchanger 38 is provided through which a portion of the exhaust air is passed.

Inducted air circulates through the enclosure 26 as indicated by the arrow 39 into contact with the agriculture 27.

Near the exhaust end 21, a portion of the inducted air is conveyed downward through a tunnel 40 from a plenum 41, as indicated by the arrows 42, 43 and as influenced by a variable speed fan and motor 44. The tunnel 40 empties into a plenum 45 having an upward exit comprising a heat exchanger 46 and one or more associated adjustable bypass louver means 47. The plenums 41 and 45 and tunnel 40 may be buried in the earth 48.

The portion of the circulated air returning through the tunnel 40 passes proportionately past the louvers 47 and through the heat exchanger 46 upward, where it is mixed with the induced air and recirculated.

Quite naturally, there is a variety of different desirable operating conditions for the operation of the greenhouse during a given time. This variety of conditions will be governed by the type of plants that are being grown in the greenhouse. The optimum growing cycle will, for instance, include a prescribed minimum and maximum temperature and humidity during the daylight hours, and a minimum and maximum temperature and humidity during the hours of darkness. The optimum times for these conditions to exist will also be known and prescribed. In order to regulate the environment in the enclosure to these optimum conditions at their prescribed times, electronic or manual control (not shown) are provided to open, position, or close the louvers 30, 37 and 47 as well as to control the speed of the motors and fans 35, 44.

The heat exchangers 38 and 46 are connected to sources of cool or warm fluids, as will later be explained in detail. The evaporative cooler 31 is of the usual type having means to pass water through the fibers in one direction, while air is passing across the fibers in contact with the water with evaporation taking place.

Another important influence on the environment within the enclosure 26 is the translucent roof panels 25 that may be of conventional construction including transparent or translucent tubings through which a liquid passes. The color of the liquid may vary from clear, such as water, to a "black liquid" obtaining suspended solid pigmentation which is dark or black in color. U.S. patent application, Ser. No. 334,773, assigned to the same assignee as this application, is a unique and ideal roof shading arrangement which can be used to advantage with this invention. The invention therein disclosed provides substantially infinite variety of shadings for maximum heat transfer or maximum opacity which may be selected as needed.

In addition, in some circumstances an atomizing spray 50 may be utilized to provide further moisture in the environment of the enclosure 26.

Referring further to FIG. 2, various other subsystems of components are schematically shown in combination with the physical structure of the greenhouse. Their combination with the greenhouse is carried out by means of fluid or electrical connections in conventional ways that will be apparent to those skilled in the art.

In particular, a cold storage tank 55 that is capable of holding a fluid, such as water, at lower temperatures is connected by a conduit 56 through a valve 57 to one inlet of the heat exchanger 46. A conduit 58 is connected from an outlet of the heat exchanger 46 through a valve 59 and a conduit 60 to the cold storage tank 55. Other conduits 61 and 62 are connected from the cold storage tank 55 to a heat exchange coil 63 in an absorption type chiller 64.

The absorption type chiller 64 is of that class of refrigeration means which operates on the absorption cycle using one or more of various refrigeration working fluids such as ammonia or water. A heat exchange generator 65 for the purpose of vaporizing the refrigerant gas is connected by a conduit 66 through a valve 67 to a hot storage tank 68. The hot storage tank 68 is constructed to hold a higher temperature fluid which is circulated by means of conduits 69 through a solar receiver 70 that is heated by the rays of the sun, depicted by the arrows. Hot fluid is conveyed by a conduit 71 through a valve 72 back to the generator 65.

The total efficiency of the system is further enhanced by another subsystem that provides means by which heat, rejected from the chiller 64, is transferred to the exhaust air 36 from the facility 26 passing through the heat exchanger 38, is conveyed in a fluid by a conduit 75. This conduit 75 conveys the fluid through a valve 76 to a heat exchange coil 77 enhancing the operation of the evaporative chiller 64. The fluid is returned through a conduit 78 and valve 79 to the heat exchanger 38.

Selectively, the valves 76, 79 may be set to convey fluid between the roof panels 25 and the heat exchanger 38. By this means heat is rejected from the roof panels 25, further improving the efficiency of the system and methods.

As another selection, the valves 76, 79 may be set to convey fluid to and from both the heat exchange coil 77 and roof panels 25 at the same time, to obtain optimum heat rejection.

Generally speaking, there are two extreme sets of conditions under which the greenhouse may be expected to operate. One is that of maximum heat, usually at or near the noonday sun in equatorial climate conditions. The opposite is the middle of cold nights. Most operating conditions will be between the maximum extreme of each of these conditions. Some conditions will be so extreme that the use of the greenhouse will be economically unattractive because of the energy requirements necessary to provide growing conditions continually. Therefore, the systems and methods provided in this inventnion may not be optimally useful in all conditions at all times. However, they will be optimally useful of the available energy at any given time because of the arrangement by which the energy is stored and reused when required under other conditions of the operating cycle.

For instance, in the mid-day period when maximum insulation is available and outside ambient temperatures are relatively high, outside air is inducted into the enclosure 26 through the evaporative cooler 31 where it absorbs moisture and is cooled. As it passes across the agriculture 27 it is further heated and absorbs more moisture as it approaches the exhaust air current under the influence of the fan 35. A portion of the contacted air is drawn downward through the tunnel 40 by the fan 44, and through the heat exchanger 46 where it is cooled and dehumidified by conduction to the cool fluid which is circulating in the heat exchanger from the cold storage tank 55 by means of conduit 56 and valve 57. The warmed fluid is returned to the cold storage tank through the valve 59 and conduit 60. The returning air portion is mixed with the inducted air to adjust the temperature and humidity of the inducted air before it is circulated into contact with the agriculture 27. The adjustment is carried out through porportioning the amount of the returning air portion, by means of the adjustable louvers 47 and/or the speed of operation of the fan 44.

At the same time, during the period of maximum insulation enough heat is collected through the solar heater 70 to provide sufficient heat in the hot storage tank for the operation of the generator 65 through circulation of the hot fluid through conduit 71 and the valve 72, returning by the conduit 66 and the valve 67.

During this operation, heat may be added to the exhaust air through the heat exchanger 48 by the circulation of hot fluid from the shading roof panels 25 through the conduits 75 and valves 76 and the conduits 80, 81.

The fluid in the cold storage tank 55 is maintained at appropriate low temperature by circulation of the fluid through the absorption chiller coils 63 by means of conduits 61 and 62.

The fluids are moved through the various subsystems appropriately by pumps (not shown) of conventional construction well known to those familiar with the art. In a like manner, the valves 57, 59, 67, 72, 76 and 79 are of typical three-way construction and may be controlled to direct the flow of fluid between any two of the three connecting inlets/outlets as influenced by conventional control means either manually, mechanically, pneumatically, or electrically or otherwise operated.

When the facility is operated at the opposite extreme of outside air and insulation conditions, the valves 72 and 57 are changed to convey fluid from the hot storage tank 68 to the heat exchanger 46. Very little outside air is admitted to the facility 26 and maximum recirculation is provided by appropriate adjustment of the adjustable louvers 30, 37, 47 to conserve heat. The roof panels 25 are drained to provide an insulating air space to prevent heat loss.

As an example subsystem for providing electrical energy for the operation of the pumps and fans which are auxiliary to the facility 26, a photo voltaic array 85 provides power to a power conditioning unit 86 which is connected to an electric battery 87 and busses 88, 89. The busses feed an auxiliary power bank 90 for water pumps, pumps in the absorption chiller, lights, controls, etc. The busses 88, 89 also feed a desalination system 91 (if required for proper plant growth) as well as the fans and fan motors 35 and 44.

As a backup, an auxiliary electric power unit, such as a motor-generator set with an internal combustion engine 93 driving an electric generator 94, is provided. In operation, the generator 94 feeds the power conditioning unit 86. Exhaust heat from the internal combustion engine 93 is circulated through a fluid in conduits 95, 96 to the hot storage tank 68. Recapture of this "waste" heat through the above described subsystem enhances the efficiency of the system, and in some circumstances, this recapture of the waste heat may more than offset the advantages of generating electrically by the photo voltaic units 85. If the further enhancement of the efficiency is enough, the construction of a photo voltaic field would not be warranted. Use of the auxiliary power waste heat will also greatly reduce the required number of solar thermal collectors 70.

Other waste heat sources may be associated with the hot storage tank in a practice of this invention. For instance, the greenhouse facility may be located close to an electric power generating facility or close to process steam (or hot fluid) in a manufacturing facility.

It is herein understood that although the present invention has been specifically disclosed with the preferred embodiment and examples, modifications and variations of the concept herein disclosed may be resorted to by those skilled in the art. Such modification and variations are considered to be within the scope of the invention and the appended claims.

what is claimed is:

1. An air circulating and conditioning system for enclosures wherein agriculture is carried out separately from ambient outside air conditions, comprising:
   a. first means for inducting a first portion of outside air into the enclosure through an evaporative cooler and for circulating the inducted air through the enclosure into contact with the agriculture;
   b. second means, thereafter in the system for circulating a second portion of the contacted air through a heat exchanger to selectively heat or cool and dehumidify said second portion; and
   c. third means for thereafter combining said second portion with the first portion of inducted air after the inducted air has passed through the evaporative cooler, to adjust the temperature and humidity of the inducted air before the combined portions and inducted air are circulated into contact with the agriculture.

2. A method of controlling the atmosphere within a controlled environment agriculture facility comprising, sequentially:
   a. inducting a first portion of outside ambient air into the agriculture facility through an evaporative cooler, thereby cooling and humidifying the air;
   b. passing and circulating the cooled and humidified first portion across the agriculture in the facility, further humidifying the air;
   c. recirculating a second portion of the circulated air through a heat exchanger, cooling and dehumidifying the air; and
   d. combining the second portion with the first portion of inducted air before said combination is circulated across the agriculture in the facility.

3. A system according to claim 1 wherein there is further provided:
   (d) means for storing the heat generated in a solar collector and/or waste heat recovery device;
   (e) means for generating a cooling effect with an absorption chiller, the chiller being connected to the heat exchanger; and
   (f) means to selectively connect the heat storing means, or the chiller means, to heat or cool the heat exchanger and the second portion of contacted air.

4. A system according to claim 3, wherein additional means is combined for exhausting a second portion of the contacted air into the outside air conditions through a second heat exchanger to heat said second portion and selectively either cool a shade control means in a structure of the enclosure or cool the absorption chiller or both.

5. A system according to claim 3 wherein means is provided to alternatively dissipate the heat generated in the heat exchanger through a heat exchange relationship with the absorption chiller.

6. A system according to claim 5 wherein the heat from the heat exchanger is dissipated in a cold storage tank and the fluid in the cold storage tank is cooled by a heat exchange relationship with the absorption chiller.

7. A system according to claim 1 wherein adjustable bypass means is provided in association with the heat exchanger to proportion the amount of contacted air passing through the heat exchanger.

8. A system according to claim 1 wherein adjustable bypass means is provided in association with the evaporative cooler to proportion the amount of inducted air through the evaporator cooler.

9. A system according to claim 1 wherein a variable speed fan is provided in the circulating means to control the volume of air in the portion of concentrated air that circulates through the heat exchanger.

10. A system according to claim 4 wherein adjustable bypass means is provided in association with the second heat exchanger to portion the amount of the second portion of contacted air which is exhausted into the outside air condition.

11. A system according to claim 4 wherein a variable speed fan is provided as a means for exhausting the second portion of the contacted air to control the volume of the second portion of contacted air which is exhausted into the outside air conditions.

12. A ethod according to claim 2 wherein the volume of the portion that is cooled and dehumidified is controlled by bypassing the heat exchanger with a selected amount of the portion.

13. A method according to claim 2 wherein the amount of outside air inducted into the agricultural facility through the evaporative cooler is controlled by bypassing the evaporative cooler with a selected amount of outside air.

14. A method according to claim 2 wherein a second portion of the contacted air is exhausted into the outside air, the second portion being passed in heat exchange relationship with a fluid from a shade control structure of the facility or an absorption chiller providing cooling for the facility or both.

15. A method according to claim 14 wherein the amount of the second portion of contacted air is controlled in heat exchange relationship by proportioning the amount of the second portion by bypassing the heat exchange relationship.

16. A method according to claim 2 wherein the cooling for the recirculated portion of the circulated air is provided by:
   e. heating a fluid in a hot storage tank by solar heat or by waste heat from an associated source;
   f. providing heat to an absorption chiller from the stored heat; and
   g. cooling the recirculated portion by conduction from a fluid conveyed from the absorption chiller.

* * * * *